United States Patent
Tan (10) Patent No.: US 10,404,534 B2
(45) Date of Patent: Sep. 3, 2019

(54) METHOD AND DEVICE FOR NETWORKING INTELLIGENT TERMINALS

(71) Applicant: GUANGDONG OPPO MOBILE TELECOMMUNICATIONS CORP., LTD., Dongguan, Guangdong (CN)

(72) Inventor: Chunhong Tan, Dongguan (CN)

(73) Assignee: GUANGDONG OPPO MOBILE TELECOMMUNICATIONS CORP. LTD., Dongguan, Guangdong (CN)

(*) Notice: Subject to any disclaimer, the term of this patent is extended or adjusted under 35 U.S.C. 154(b) by 0 days.

(21) Appl. No.: 15/555,357

(22) PCT Filed: Jul. 26, 2016

(86) PCT No.: PCT/CN2016/091805
§ 371 (c)(1),
(2) Date: Sep. 1, 2017

(87) PCT Pub. No.: WO2017/067261
PCT Pub. Date: Apr. 27, 2017

(65) Prior Publication Data
US 2018/0041387 A1    Feb. 8, 2018

(30) Foreign Application Priority Data
Oct. 20, 2015   (CN) .......................... 2015 1 0683676

(51) Int. Cl.
*H04L 12/28* (2006.01)
*H04L 12/24* (2006.01)
(Continued)

(52) U.S. Cl.
CPC ...... *H04L 41/0806* (2013.01); *H04L 12/4625* (2013.01); *H04L 41/12* (2013.01);
(Continued)

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS

| | | | |
|---|---|---|---|
| 2005/0014467 A1* | 1/2005 | Ishiwata | H04W 84/20 455/39 |
| 2012/0008526 A1* | 1/2012 | Borghei | H04W 4/021 370/254 |

(Continued)

FOREIGN PATENT DOCUMENTS

| CN | 102752881 A | 10/2012 |
|---|---|---|
| CN | 103023681 A | 4/2013 |

(Continued)

*Primary Examiner* — Siren Wei
(74) *Attorney, Agent, or Firm* — Hodgson Russ LLP (57) ABSTRACT

Provided a method for networking intelligent terminals. The method includes regularly transmitting a networking connection message by a first intelligent terminal in an intelligent terminal system. Upon receiving, by the first intelligent terminal, a networking request returned by a second intelligent terminal according to the networking connection message, the first intelligent terminal controls the second intelligent terminal to join the intelligent terminal system. Also provided is a device for networking intelligent terminals.

20 Claims, 3 Drawing Sheets

(51) Int. Cl.
*H04W 76/10* (2018.01)
*H04W 48/10* (2009.01)
*H04W 76/11* (2018.01)
*H04L 12/46* (2006.01)

(52) U.S. Cl.
CPC .......... *H04W 48/10* (2013.01); *H04W 76/10* (2018.02); *H04W 76/11* (2018.02)

(56) References Cited

U.S. PATENT DOCUMENTS

| | | | | |
|---|---|---|---|---|
| 2012/0115464 A1* | 5/2012 | Jang | ...................... | G01S 5/0205 |
| | | | | 455/426.1 |
| 2014/0089389 A1* | 3/2014 | Kim | ........................ | H04L 67/42 |
| | | | | 709/203 |
| 2015/0172061 A1* | 6/2015 | Lee | ........................ | H04W 12/04 |
| | | | | 713/176 |
| 2015/0186636 A1* | 7/2015 | Tharappel | ............... | G06F 21/32 |
| | | | | 726/8 |
| 2015/0189504 A1* | 7/2015 | Chew | .................... | H04W 76/10 |
| | | | | 713/168 |
| 2017/0064534 A1* | 3/2017 | Loehr | ................... | H04W 72/04 |

FOREIGN PATENT DOCUMENTS

| | | | |
|---|---|---|---|
| CN | 104038397 | A | 9/2014 |
| CN | 104486174 | A | 4/2015 |
| CN | 204652433 | U | 9/2015 |
| CN | 104980839 | A | 10/2015 |
| CN | 105246128 | A | 1/2016 |
| CN | 105246129 | A | 1/2016 |

\* cited by examiner

METHOD AND DEVICE FOR NETWORKING INTELLIGENT TERMINALS

CROSS REFERENCE TO RELATED APPLICATION

This application is an International Application No. PCT/CN2016/091805, filed on Jul. 26, 2016, which claims priority to Chinese Application No. 201510683676.X, filed Oct. 20, 2015. The entire disclosures of the above applications are incorporated herein by reference.

BACKGROUND

1. Field of the Disclosure

The embodiments of the present disclosure relate to intelligent terminal technology, and more particularly, to a method and device for networking intelligent terminals.

2. Description of the Related Art

An intelligent terminal system is a collection of intelligent apparatuses that establishes a wireless network, using a plurality of intelligent terminals, such as intelligent speakers, lamps, refrigerators, and chairs having a same interaction protocol. With continuous development of intelligence technology, the intelligent terminal system is widely used in every aspect of social life including industrial production, daily office work, and daily life.

Currently, a user can control each intelligent terminal included in an intelligent terminal system, using a control terminal in a same wireless network as the intelligent terminal system. This manner of control has better user interactivity and convenience, and is a current direction of family home intelligent terminals.

However, operations of adding a new intelligent terminal to the intelligent terminal system are complicated and cumbersome. This does not satisfy needs of users.

SUMMARY

The present disclosure provides a method and device for networking intelligent terminals for simplifying the operation of adding a new intelligent terminal to the intelligent terminal system.

At least one embodiment of the present disclosure provides a method for networking intelligent terminals. The method includes regularly transmitting a networking connection message by a first intelligent terminal in an intelligent terminal system; and upon the first intelligent terminal receives a networking request returned by a second intelligent terminal according to the networking connection message, controlling the second intelligent terminal to join the intelligent terminal system by the first intelligent terminal. The second intelligent terminal is arranged outside the intelligent terminal system and is a new intelligent terminal requesting to be added to the intelligent terminal system.

At least one embodiment of the present disclosure further provides a method for networking intelligent terminals. The method includes regularly acquiring a networking connection message transmitted by a first intelligent terminal, the regularly acquiring step executed by a second intelligent terminal; and creating a wireless communication connection to a wireless network connecting to an intelligent terminal system, by the second intelligent terminal according to the acquired networking connection message, and transmitting, by the second intelligent terminal, a networking request to the first intelligent terminal for being added to the intelligent terminal system. The second intelligent terminal is arranged outside the intelligent terminal system and is a new intelligent terminal requesting to be added to the intelligent terminal system.

At least one embodiment of the present disclosure further provides a device for networking intelligent terminals. The device is deployed at least in a first intelligent terminal of an intelligent terminal system. The device includes a message transmitting module configured to regularly transmit a networking connection message; and a request receiving module configured to control a second intelligent terminal to join the intelligent terminal system upon the first intelligent terminal receives a networking request returned by the second intelligent terminal according to the networking connection message. The second intelligent terminal is arranged outside the intelligent terminal system and is a new intelligent terminal requesting to be added to the intelligent terminal system.

At least one embodiment of the present disclosure further provides a device for networking intelligent terminals. The device is deployed at least in an intelligent terminal. The intelligent terminal is arranged outside the intelligent terminal system and is a new intelligent terminal requesting to be added to the intelligent terminal system. The device includes a message acquiring module configured to regularly acquire a networking connection message transmitted by another intelligent terminal; and a request transmitting module configured to create a wireless communication connection to a wireless network connecting to the intelligent terminal system, according to the acquired networking connection message, and transmit a networking request to the another intelligent terminal for being added to the intelligent terminal system.

In the technical schemes provided in the embodiments of the present disclosure, the first intelligent terminal (e.g., a dominant intelligent terminal) of the intelligent terminal system regularly transmits the networking connection message. Upon receiving the networking request returned by the second intelligent terminal (e.g., a new intelligent terminal), the first intelligent terminal controls the second intelligent terminal to join the intelligent terminal system. This solves the problem that the intelligent terminal system cannot add a new intelligent terminal by itself, and simplifies the operation of adding a new intelligent terminal by the intelligent terminal system.

DETAILED DESCRIPTION OF THE PREFERRED EMBODIMENTS

The present disclosure will be described in further detail below with reference to the embodiments in accompanying with the appending drawings. It should be understood that the specific embodiments described herein are merely for illustrating the present disclosure, and the present disclosure is not limited thereto. In addition, it is required further to explain that for ease of description, the appending drawings merely show related parts of the present disclosure, rather than all structure.

Figure 1:
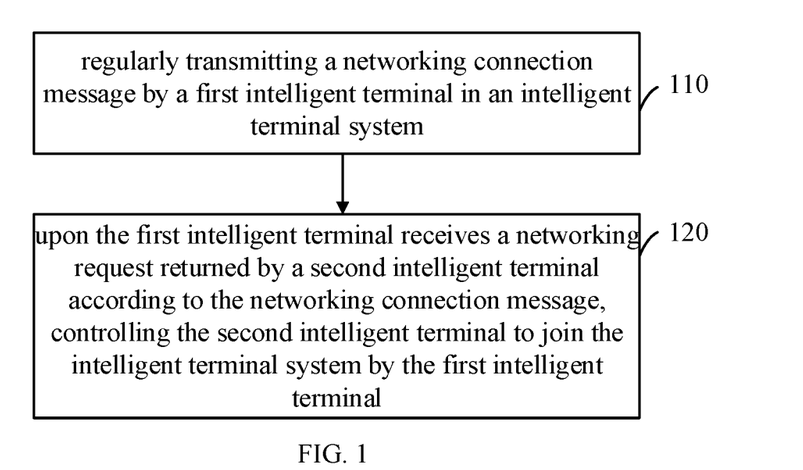
FIG. 1 is a schematic flowchart of a method for networking intelligent terminals provided in at least one embodiment of the present disclosure.

FIG. 1 is a schematic flowchart of a method for networking intelligent terminals provided in at least one embodiment of the present disclosure. The present embodiment is suitable in a situation that the intelligent terminal system intends to add a new intelligent terminal. The aforesaid method may be executed by a networking device of the intelligent terminal. The networking device may be carried by software and/or hardware, and may be deployed in a first intelligent terminal (e.g., a dominant intelligent terminal) of the intelligent terminal system.

Referring to FIG. 1, the method for networking intelligent terminals provided in the present embodiment may include actions at the following blocks.

At block 110, a networking connection message is regularly transmitted by a first intelligent terminal in an intelligent terminal system.

In at least one embodiment of the present disclosure, the intelligent terminal system includes a plurality of intelligent terminals. The plurality of intelligent terminals may belong to a same type of intelligent terminals, for example, the intelligent terminal system consists of a plurality of intelligent chairs. The plurality of intelligent terminals may include various types of intelligent terminals, for example, the intelligent terminal system consists of a plurality of intelligent chairs, a plurality of intelligent lamps, and a plurality of televisions. The first intelligent terminal may be carried out by a dominant intelligent terminal. By multicasting or broadcasting, the dominant intelligent terminal of the intelligent terminal system regularly transmits a networking connection message according to a preset periodic time interval. The networking connection message includes the necessary information for the intelligent terminal system to add a second intelligent terminal (i.e., a new intelligent terminal).

In order to determine the dominant intelligent terminal of the intelligent terminal system, before the dominant intelligent terminal of the intelligent terminal system transmits the networking connection message, the method may include determining at least one dominant intelligent terminal from at least one intelligent terminal based on attribute information of the least one intelligent terminal included in the intelligent terminal system.

In an embodiment, the at least one dominant intelligent terminal is determined according to a priority order contained in the attribute information of the respective intelligent terminals included in the intelligent terminal system. That is, in the present embodiment, not only one single dominant intelligent terminal can be determined in the intelligent terminal system, but a plurality of dominant intelligent terminals also can be determined.

The attribute information may include signal strength, network bandwidth, or available system resources. For example, when the attribute information is implemented by the signal strength, one or more intelligent terminals having the greatest signal strength can be determined to be the dominant intelligent terminal. When the attribute information is implemented by the network bandwidth, one or more intelligent terminals having the maximum network bandwidth can be determined to be the dominant intelligent terminal. When the attribute information is implemented by the available system resources, one or more intelligent terminals having the most available system resources can be determined to be the dominant intelligent terminal.

At block 120, upon the first intelligent terminal receives a networking request returned by a second intelligent terminal according to the networking connection message, the first intelligent terminal controls the second intelligent terminal to join the intelligent terminal system.

In some embodiments, after receiving the networking connection message, the second intelligent terminal can transmit the networking request to the first intelligent terminal to request to be added to the intelligent terminal system. The first intelligent terminal receives the networking request and determines whether the second intelligent terminal is an apparatus that the intelligent terminal system allows to add. If yes, the networking request is accepted and the second intelligent terminal is controlled to be added to the intelligent terminal system. If no, the second intelligent terminal is refused to be added to the intelligent terminal system.

The second intelligent terminal is outside the intelligent terminal system and is an intelligent terminal requesting to be added to the intelligent terminal system. The second intelligent terminal is a new intelligent terminal, which may be implemented by intelligent chairs, intelligent lamps, or intelligent televisions.

In the technical scheme provided in the present embodiment, the first intelligent terminal (e.g., the dominant intelligent terminal) of the intelligent terminal system regularly transmits the networking connection message. Upon receiving the networking request returned by the second intelligent terminal (e.g., the new intelligent terminal) according to the networking connection message, the first intelligent terminal controls the second intelligent terminal to join the intelligent terminal system. This solves the problem that the intelligent terminal system cannot add a new intelligent terminal by itself, and simplifies the operation of adding a new intelligent terminal by the intelligent terminal system.

Figure 2:
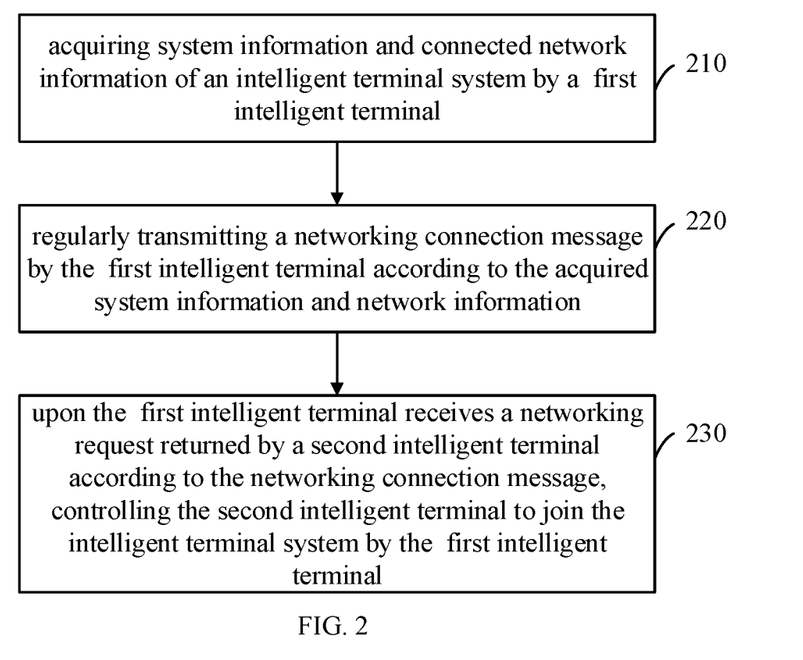
FIG. 2 is a schematic flowchart of another method for networking intelligent terminals provided in at least one embodiment of the present disclosure.

In at least one embodiment of the present disclosure, the actions at the block of regularly transmitting the networking connection message by the first intelligent terminal are further explained based on the afore-described embodiment. FIG. 2 is a schematic flowchart of another method for networking intelligent terminals provided in at least one embodiment of the present disclosure.

Referring to FIG. 2, the method for networking intelligent terminals provided in the present embodiment may include actions at the following blocks.

At block 210, system information and connected network information of an intelligent terminal system are acquired by a first intelligent terminal.

Before transmitting the networking connection message, the first intelligent terminal acquires system information of the intelligent terminal system and also acquires network information via the network of the intelligent terminal system.

In the present embodiment, the system information may include an internet protocol (IP) address or a media access control (MAC) address of an intelligent terminal included in the intelligent terminal system. The intelligent terminal system connects to a wireless network. The network information may include a service set identifier (SSID) and a password.

The system information may further include a communication protocol between the respective intelligent terminals included in the intelligent terminal system. For example, the intelligent terminal system may be configured as master-slave construction. That is, the intelligent terminal system includes a dominant intelligent terminal and a plurality of subordinate intelligent terminals. The dominant intelligent terminal communicates with all of the subordinate intelligent terminals. The subordinate intelligent terminals do not communicate with one another. The intelligent terminal system may be configured as a peer-to-peer structure. That is, communication can be carried out between different intelligent terminals included in the intelligent terminal system.

At block 220, a networking connection message is regularly transmitted by the first intelligent terminal according to the acquired system information and network information.

After acquiring the system information and the network information, by multicasting or broadcasting, the first intelligent terminal regularly transmits, according to a preset periodic time interval, the networking connection message including the system information and the network information.

At block 230, upon the first intelligent terminal receives a networking request returned by a second intelligent terminal according to the networking connection message, the first intelligent terminal controls the second intelligent terminal to join the intelligent terminal system.

In order to add the information of the second intelligent terminal (i.e., a new intelligent terminal) to the system information, after the first intelligent terminal controls the second intelligent terminal to join the intelligent terminal system, the method may further include updating the system information by at least one intelligent terminal included in the intelligent terminal system and synchronizing the updated system information with a control terminal connecting to the intelligent terminal system.

The control terminal is configured to execute a control operation to the intelligent terminal system. In the present embodiment, the intelligent terminal system can add new intelligent terminals whatever the control terminal works online or offline, that is, the intelligent terminal system can control addition of new intelligent terminals, no matter whether the control terminal is connected to the wireless network. In order to assure accuracy of the control operation executed by the control terminal to the intelligent terminal system, after the system information is updated and the control terminal is detected to be online, the updated system information is synchronized with the control terminal.

In the technical scheme provided in the present embodiment, the first intelligent terminal (e.g., the dominant intelligent terminal) acquires and regularly transmits the system information and the connected network information of the intelligent terminal system. Upon receiving the networking request from the second intelligent terminal (e.g., the new intelligent terminal), the first intelligent terminal adds the second intelligent terminal to the intelligent terminal system. This simplifies the operation of adding a new intelligent terminal to the intelligent terminal system.

Figure 3:
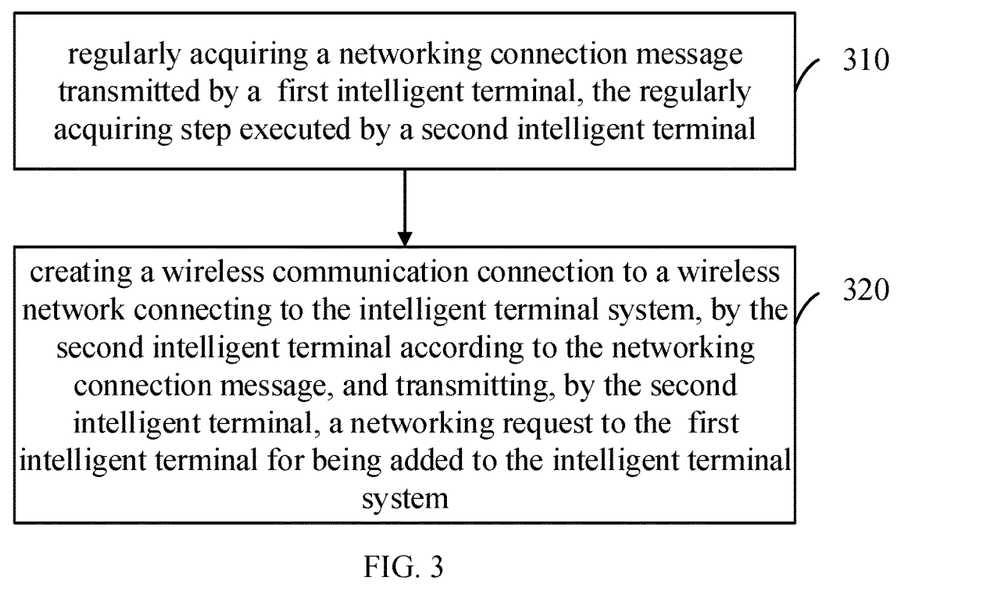
FIG. 3 is a schematic flowchart of still another method for networking intelligent terminals provided in at least one embodiment of the present disclosure.

FIG. 3 is a schematic flowchart of still another method for networking intelligent terminals provided in at least one embodiment of the present disclosure. The present embodiment is suitable in a situation that the intelligent terminal system intends to add a new intelligent terminal. The aforesaid method may be executed by a networking device of the intelligent terminal. The networking device may be carried by software and/or hardware, and may be deployed in the second intelligent terminal (i.e., the new intelligent terminal).

Referring to FIG. 3, the method for networking intelligent terminals provided in the present embodiment may include actions at the following blocks.

At block 310, a networking connection message transmitted by a first intelligent terminal is regularly acquired by a second intelligent terminal.

The second intelligent terminal is outside the intelligent terminal system and is an intelligent terminal requesting to be added to the intelligent terminal system. The second intelligent terminal is a new intelligent terminal, which may be implemented by intelligent chairs, intelligent lamps, or intelligent televisions.

By enabling receiving multicast or broadcast information, the second intelligent terminal regularly receives the networking connection message transmitted by the first intelligent terminal. In an embodiment, the first intelligent terminal may be implemented by a dominant intelligent terminal. In another embodiment, there are a plurality of first intelligent terminals, the second intelligent terminal can primarily receive the networking connection message transmitted by the first intelligent terminal closest to the second intelligent terminal. It should be noted that the second intelligent terminal can receive the networking connection message transmitted by only single one first intelligent terminal, and can also receive the networking connection messages transmitted by different first intelligent terminals.

At block 320, according to the networking connection message, the second intelligent terminal creates a wireless communication connection to a wireless network connecting to the intelligent terminal system, and transmits a networking request to the first intelligent terminal to be added to the intelligent terminal system.

After receiving the networking connection message transmitted by the first intelligent terminal, the second intelligent terminal accesses the wireless network that the intelligent terminal system is connected to, according to network information of the networking connection message. Also, according to system information of the networking connection message, the second intelligent terminal transmits the networking request to the first intelligent terminal to access the intelligent terminal system. After the first intelligent terminal accepts the networking request, the second intelligent terminal is added to the intelligent terminal system.

After the networking request is transmitted to the first intelligent terminal, the method may further include creating, by the second intelligent terminal, a wireless communication connection to a control terminal connecting to the intelligent terminal system.

After the networking request transmitted by the second intelligent terminal is accepted, a wireless communication connection is established between the second intelligent terminal and the control terminal connecting to the intelligent terminal system. In such a way, the control terminal is notified that the second intelligent terminal has been already added to the intelligent terminal system, and the second intelligent terminal is connected to the control terminal and is controlled by the control terminal.

In the technical scheme provided in the present embodiment, after acquiring the networking connection message transmitted by the first intelligent terminal (e.g, the dominant intelligent terminal), the second intelligent terminal (e.g., the new intelligent terminal) transmits the networking request to the first intelligent terminal to request to be added to the intelligent terminal system. In such a way, a new intelligent terminal can be added to the intelligent terminal system in a situation that the control terminal works offline. This simplifies the operation of adding a new intelligent terminal by the intelligent terminal system.

Figure 4:
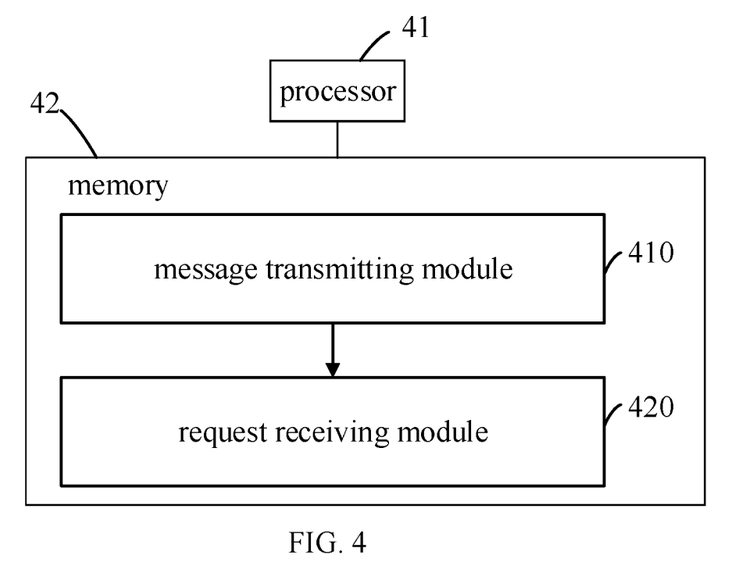
FIG. 4 is a schematic structural diagram showing a device for networking intelligent terminals provided in at least one embodiment of the present disclosure.

FIG. 4 is a schematic structural diagram showing a device for networking intelligent terminals provided in at least one embodiment of the present disclosure. The device for networking intelligent terminals provided in the present embodiment may be deployed at least in first intelligent terminal (e.g., a dominant intelligent terminal) of an intelligent terminal system.

Referring to FIG. 4, the device may include a processor 41 and a memory 42. The memory 42 is used for storing instructions. The processor 41 is coupled to the memory 42, and is used to execute the instructions stored inside the memory 42. All of the modules 410 and 420, and other modules or units as introduced below, are instructions executable by the processor 41 to perform corresponding functions. The networking device is described below.

A message transmitting module 410 is configured to regularly transmit a networking connection message.

A request receiving module 420 is configured to control a second intelligent terminal to join the intelligent terminal system upon receiving a networking request returned by the second intelligent terminal according to the networking connection message. The second intelligent terminal is a new intelligent terminal outside the intelligent terminal system, and is a terminal requesting to be added to the intelligent terminal system.

The device for networking intelligent terminals may further include the following features.

A terminal determination module is configured to determine, before regularly transmitting the networking connection message, at least one first intelligent terminal from at least one intelligent terminal based on attribute information acquired from the least one intelligent terminal included in the intelligent terminal system.

In the present embodiment, the attribute information may include signal strength, network bandwidth, or available system resources.

In the present embodiment, the message transmitting module 410 may be configured to acquire system information and connected network information of the intelligent terminal system, and regularly transmit the networking connection message according to the acquired system information and network information.

In the present embodiment, the system information may include an IP address or a MAC address of an intelligent terminal included in the intelligent terminal system.

The intelligent terminal system connects to a wireless network. The network information may include a SSID and a password.

The device for networking intelligent terminals may further include the following features.

A message synchronizing module is configured to acquire, after the first intelligent terminal controls the second intelligent terminal to join the intelligent terminal system, system information updated by at least one intelligent terminal included in the intelligent terminal system, and synchronize the updated system information with a control terminal connecting to the intelligent terminal system.

The device for networking intelligent terminals provided in the present embodiment belongs to an invention concept as the same as the method for networking intelligent terminals executed by the first intelligent terminal provided in any arbitrary embodiment of the present disclosure, and can execute the method for networking intelligent terminals executed by the first intelligent terminal provided in any arbitrary embodiment of the present disclosure, and has corresponding functional modules and beneficial effects. The technical details not described detailedly in the present embodiment can be referred to the method for networking intelligent terminals executed by the first intelligent terminal provided in any arbitrary embodiment of the present disclosure.

Figure 5:
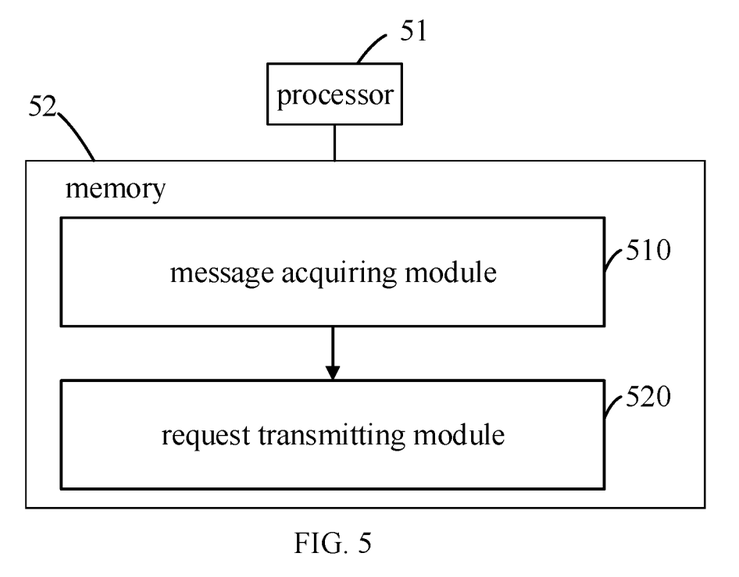
FIG. 5 is a schematic structural diagram showing another device for networking intelligent terminals provided in at least one embodiment of the present disclosure.

FIG. 5 is a schematic structural diagram showing another device for networking intelligent terminals provided in at least one embodiment of the present disclosure. The device for networking intelligent terminals provided in the present embodiment can be deployed at least in a second intelligent terminal. The second intelligent terminal is a new intelligent terminal outside the intelligent terminal system, and is a terminal requesting to be added to the intelligent terminal system. Referring to FIG. 5, the device may include a processor 51 and a memory 52. The memory 52 is used for storing instructions. The processor 51 is coupled to the memory 52, and is used to execute the instructions stored inside the memory 52. All of the modules 510 and 520, and other modules or units as introduced below, are instructions executable by the processor 51 to perform corresponding functions. The networking device is described below.

A message acquiring module 510 is configured to regularly acquire a networking connection message transmitted by a first intelligent terminal.

A request transmitting module 520 is configured to create a wireless communication connection to a wireless network connecting to the intelligent terminal system, according to the acquired networking connection message, and transmit a networking request to the first intelligent terminal to request to be added to the intelligent terminal system.

The device for networking intelligent terminals may further include the following features.

A connection establishing module is configured to creating, after the networking request is transmitted to the first intelligent terminal, a wireless communication connection to a control terminal connecting to the intelligent terminal system.

During particular implementation, the above various units may be implemented as independent entities, or may be combined arbitrarily as the same entity or a number of entities. The particular implementation of the above various units may be referred to the above method embodiments, and will not be described here in detail.

The device for networking intelligent terminals provided in the present embodiment belongs to an invention concept as the same as the method for networking intelligent terminals executed by the second intelligent terminal provided in any arbitrary embodiment of the present disclosure, and can execute the method for networking intelligent terminals executed by the second intelligent terminal provided in any arbitrary embodiment of the present disclosure, and has corresponding functional modules and beneficial effects. The technical details not described detailedly in the present embodiment can be referred to the method for networking intelligent terminals executed by the second intelligent terminal provided in any arbitrary embodiment of the present disclosure.

It is noted that above descriptions are merely preferred embodiments of the present disclosure and technical principles thereof. A person having ordinary skill in the art is easy to understand that the present disclosure is not limited to the specific embodiments described herein, and a person having ordinary skill in the art can make various obvious variations, adjustments, and substitutes within the protected scope of the present disclosure. Therefore, although above embodiments state the present disclosure in detail, the present disclosure is not limited to the embodiments, and there can be many other equivalent embodiments within the scope of the present disclosure, and the protected scope of the present disclosure is determined by the appending claims.

What is claimed is:

1. A method for networking intelligent terminals, comprising:
regularly transmitting a networking connection message by a first intelligent terminal as a provisional master in an intelligent terminal system, wherein the intelligent terminal system comprises the first intelligent terminal and a control terminal, the control terminal is not connected to the intelligent terminal system; and
upon the first intelligent terminal receiving a networking request returned by a second intelligent terminal not comprised in the intelligent terminal system according to the networking connection message, controlling the second intelligent terminal to join the intelligent terminal system by the first intelligent terminal;
wherein the first intelligent terminal acquires information on a protocol, the protocol allowing the first intelligent terminal to communicate with the second intelligent terminals but not the second intelligent terminals to communicate with each other.

2. The method according to claim 1, before regularly transmitting the networking connection message by the first intelligent terminal as the provisional master in the intelligent terminal system, further comprising:
determining the first intelligent terminal from at least one intelligent terminal based on attribute information of the at least one intelligent terminal in the intelligent terminal system.

3. The method according to claim 2, wherein the attribute information comprises signal strength, network bandwidth, or available system resources.

4. The method according to claim 1, further comprising:
acquiring system information and connected network information of the intelligent terminal system by the first intelligent terminal; and
regularly transmitting the networking connection message by the first intelligent terminal according to the acquired system information and network information.

5. The method according to claim 4, wherein regularly transmitting the networking connection message by the first intelligent terminal as the provisional master according to the acquired system information and network information, comprising:
regularly transmitting the networking connection message by the first intelligent terminal by multicasting or broadcasting according to the acquired system information and network information.

6. The method according to claim 4, wherein the system information comprises an internet protocol (IP) address or a media access control (MAC) address of an intelligent terminal in the intelligent terminal system; the intelligent terminal system connects to a wireless network, and the network information comprises a service set identifier (SSID) and a password.

7. The method according to claim 1, before controlling the second intelligent terminal to join the intelligent terminal system by the first intelligent terminal, further comprising:
determining, by the first intelligent terminal, whether the second intelligent terminal is an apparatus that the intelligent terminal system allows to add; if yes, accepting the networking request, and triggering execution of the step of controlling the second intelligent terminal to join the intelligent terminal system by the first intelligent terminal.

8. A method for networking intelligent terminals, comprising:
regularly acquiring a networking connection message transmitted by a first intelligent terminal as a provisional master, the regularly acquiring step executed by a second intelligent terminal not comprised in an intelligent terminal system; wherein the intelligent terminal system comprises the first intelligent terminal and a control terminal, the control terminal is not connected to the intelligent terminal system; and
creating a wireless communication connection to a wireless network connecting to an intelligent terminal system, by the second intelligent terminal not comprised in the intelligent terminal system according to the acquired networking connection message;
wherein the first intelligent terminal acquires information on a protocol, the protocol allowing the first intelligent terminal to communicate with the second intelligent terminals but not the second intelligent terminals to communicate with each other.

9. A device for networking intelligent terminals, the device deployed in a first intelligent terminal as a provisional master in an intelligent terminal system, wherein the intelligent terminal system comprises the first intelligent terminal and a control terminal, the control terminal not connected to the intelligent terminal system; the device comprising:
a processor; and
a memory connected with the processor, the memory comprising a plurality of program instructions executable by the processor configured to execute a method, the method comprising:
regularly transmitting a networking connection message; and
controlling a second intelligent terminal to join the intelligent terminal system upon the first intelligent terminal receiving a networking request returned by the second intelligent terminal not comprised in the intelligent system according to the networking connection message;
wherein the first intelligent terminal acquires information on a protocol, the protocol allowing the first intelligent terminal to communicate with the second intelligent terminals but not the second intelligent terminals to communicate with each other.

10. The device according to claim 9, wherein the method further comprises:
determining, before regularly transmitting the networking connection message, the first intelligent terminal from at least one intelligent terminal as the provisional master based on attribute information acquired from the least one intelligent terminal in the intelligent terminal system.

11. The device according to claim 10, wherein the attribute information comprises signal strength, network bandwidth, or available system resources.

12. The device according to claim 9, wherein the method further comprises:
acquiring system information and connected network information of the intelligent terminal system, and regularly transmitting the networking connection message according to the acquired system information and network information.

13. The device according to claim 12, wherein the method further comprises:

regularly transmitting the networking connection message by multicasting or broadcasting according to the acquired system information and network information.

14. The device according to claim 12, wherein the system information comprises an internet protocol (IP) address or a media access control (MAC) address of an intelligent terminal in the intelligent terminal system; the intelligent terminal system connects to a wireless network, and the network information comprises a service set identifier (SSID) and a password.

15. The device according to claim 9, wherein the method further comprises:
determining whether the second intelligent terminal is an apparatus that the intelligent terminal system allows to add; if yes, accepting the networking request and triggering execution of the step of controlling the second intelligent terminal to join the intelligent terminal system by the first intelligent terminal.

16. A device for networking intelligent terminals, the device deployed in an intelligent terminal, in which the intelligent terminal is not comprised in an intelligent terminal system, and the intelligent terminal system comprises a first intelligent terminal and a control device, the control device is not connected to the intelligent terminal system, the device comprising:
a processor; and
a memory connected with the processor, the memory comprising a plurality of program instructions executable by the processor configured to execute a method, the method comprising:

regularly acquiring a networking connection message transmitted by a first intelligent terminal as the provisional master; and
according to the acquired networking connection message, creating a wireless communication connection to a wireless network connecting to the intelligent terminal system; wherein the first intelligent terminal acquires information on a protocol, the protocol allowing the first intelligent terminal to communicate with the second intelligent terminals but not the second intelligent terminals to communicate with each other.

17. The method according to claim 1, further comprising:
updating system information by at least one intelligent terminal in the intelligent terminal system and synchronizing the updated system information with the control terminal.

18. The method according to claim 8, further comprising:
creating the wireless communication connection to the control terminal.

19. The device according to claim 9, wherein the method further comprises:
acquiring system information updated by at least one intelligent terminal in the intelligent terminal system, and synchronizing the updated system information with the control terminal.

20. The device according to claim 16, wherein the method further comprises:
creating the wireless communication connection to the control terminal.

* * * * *